United States Patent [19]
Bakke et al.

[11] Patent Number: 5,621,766
[45] Date of Patent: Apr. 15, 1997

[54] METHOD AND APPARATUS FOR BURST DETECTING

[75] Inventors: Bradley B. Bakke, Elgin; John W. Arens, Grayslake, both of Ill.

[73] Assignee: Motorola, Inc., Schaumburg, Ill.

[21] Appl. No.: 332,159

[22] Filed: Oct. 31, 1994

[51] Int. Cl.⁶ ................................................ H03D 1/00
[52] U.S. Cl. .............. 375/340; 375/342; 375/344; 375/354; 375/350; 370/520
[58] Field of Search .................... 375/207, 324, 375/326, 340, 342, 343, 344, 350, 354, 357, 359, 360, 362, 364, 365, 368, 224, 346, 317; 327/24, 26, 37; 364/724.11; 370/100.1, 105.4, 105.5, 108

[56] References Cited

U.S. PATENT DOCUMENTS

| | | |
|---|---|---|
| 4,873,683 | 10/1989 | Borth et al. ...................... 370/95.1 |
| 5,276,706 | 1/1994 | Critchlow ............................ 375/368 |
| 5,282,227 | 1/1994 | Crawford ............................ 375/342 |
| 5,426,670 | 6/1995 | Leppanen et al. .................. 375/343 |

OTHER PUBLICATIONS

Proakis, John G., *Digital Communications*, 2nd ed., McGraw–Hill, Inc., 1989, pp. 318–322.

*Primary Examiner*—Young T. Tse
*Assistant Examiner*—Amanda T. Le
*Attorney, Agent, or Firm*—Daniel W. Juffernbruch

[57] ABSTRACT

A burst detector (140) detects the occurrence of a burst in a signal receiver. A filter (220) having an impulse response characteristic of an expected burst filters a received signal. A subtractor (230) subtracts a filtered version of the received signal from a delayed and filtered version of the received signal to provide a detection signal. A burst edge detector (250) detects a leading edge of the burst based on the detection signal.

36 Claims, 4 Drawing Sheets

METHOD AND APPARATUS FOR BURST DETECTING

BACKGROUND OF THE INVENTION

1. Technical Field

The present invention relates to a signal receiver and, more specifically, relates to a signal receiver using a burst detector to detect the occurrence of a burst.

2. Description of the Related Art

A pulse communication receiver, such as a digital receiver or a radar receiver, must obtain a time reference to decode a received signal. A burst can be detected in the received signal to provide the time reference. In a digital communication system, such as a TDMA (time division multiple access) communication system., frames of information are periodically received. A timing reference for a received frame can be obtained by detecting any expected burst at a deterministic position within the frame. For example, a burst occurring at the beginning or other location of a frame can be detected to obtain a time reference for decoding the received signal. Once a burst has been detected information can be extracted from the frame or other portions of the received signal. This information can also be used to obtain timing for subsequent frames. Such frame synchronization is required before detecting information to provide an output for the user of the receiver.

In a previous receiver, a received signal is correlated with an expected pattern to establish a timing reference. Specifically, the correlation of the received signal with the expected signal is followed by detection of a correlation peak to establish the timing reference. This system requires transmission from a transmitter to a receiver of dedicated patterns consuming valuable frequency spectrum and restricting system capacity. Should a system be established without dedicated patterns for establishing a timing reference, system capacity is increased and frequency spectrum conserved.

When the transmitter and receiver obtain large frequency differences, the above correlation technique becomes unreliable. These large frequency differences can be caused by differences in the transmitter's and receiver's reference frequencies due to, for example, crystal errors. Furthermore, this large frequency difference can be caused when the receiver moves relative to the transmitter at a large velocity. For example, an aircraft or a satellite is fast moving and typically would have Doppler frequency errors when communicating with a ground station or another aircraft or satellite. As the transmitter and receiver obtain a larger frequency difference, the received signal moves outside the range of correlation with the expected pattern. Thus, as the frequency difference increases, the received signal and expected pattern become increasingly decorrelated and hence more difficult to establish a timing reference.

In another known receiver, such as a Rake receiver, multiple receiver paths each having a different frequency offset perform simultaneous correlation with an expected pattern to establish a time reference. As a result of having multiple receiver paths, the frequency difference seen by one of the receiver paths may be small enough to get an adequate detection of a correlation peak. However, this approach requires multiple receiver paths adding additional cost and complexity to the receiver. Furthermore, the multiple receiver paths require additional processing time and could cause delays before a choice between the multiple paths can be made.

The performance of either of the above techniques also degrades as the signal to noise ratio decreases. This performance degradation is caused by false detection of the correlation peak. As the signal to noise ratio decreases, correlation peaks due to noise are hard to distinguish from a correlation peak with the expected pattern.

DETAILED DESCRIPTION OF THE PREFERRED EMBODIMENTS

Figure 1:
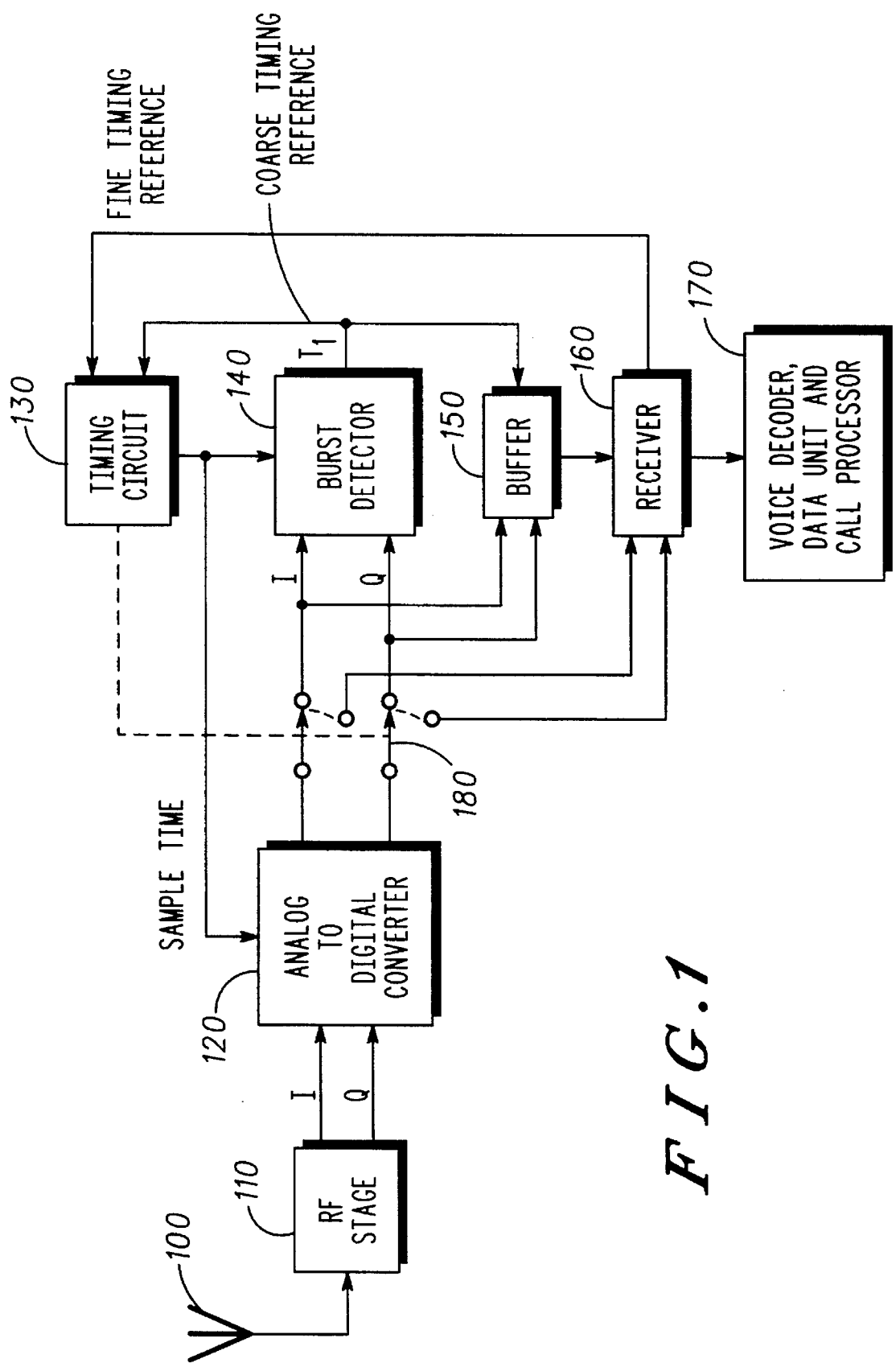
FIG. 1 illustrates a block diagram of a radio receiver with burst detection according to the present invention.

FIG. 1 illustrates a block diagram of a radio receiver with burst detection according to the present invention. Antenna 100 receives a radio frequency signal and a radio frequency (RF) stage 110 converts the radio frequency signal to an in-phase signal (I) and a quadrature signal (Q). An analog to digital converter 120 samples the in-phase signal and the quadrature signal to produce a digital in-phase signal and a digital quadrature signal in response to a sample timing from a timing circuit 130. A burst detector 140 establishes a coarse timing reference $T_1$ in response to the digital in-phase signal and the digital quadrature signal from the analog to digital converter 120 and in response to the sample time from the timing circuit 130. The digital in-phase signal and the digital quadrature signal from the analog to digital converter 120 are stored in a buffer 150. Upon detection of a burst as indicated by the coarse timing reference $T_1$ from the burst detector 140 the signals stored in the buffer 150 are transferred to a receiver 160. Thereafter, the receiver provides a fine timing reference to the timing circuit 130 and can deliver received data to a voice decoder, a data unit and a call processor 170, for example, of the radio receiver.

The present invention increases system capacity and conserves frequency spectrum by not requiring dedicated patterns to establish a timing reference. Reliable burst detection by the present invention is possible even when a transmitter and receiver obtain large frequency differences due to Doppler shifts or crystal errors. This is because the filter of the present invention reliably detects bursts without using dedicated patterns or a programmed correlation sequence. The present invention does not degrade the signal to noise ratio due to false detection of correlation peaks. In the present invention, the characteristics of the signal itself are recognized. For instance, a constant power transient characteristic can be detected when the signal bursts. The present invention also avoids multiple receiver paths to establish a timing reference, such as in a Rake receiver, thus saving processing time.

When the burst detector 140 detects a burst as indicated by the coarse timing reference $T_1$, the timing circuit 130 causes a mode change from a burst detection mode to a gated receive mode. While in the burst detection mode, a timing reference has not yet been obtained by the burst detector 140 and information can not yet be extracted to provide an output for the user of the receiver. After a timing reference has been obtained by the burst detector 140, information can subsequently be obtained from the received signal by the receiver 160 under the assumption that the timing will be slowly varying. A mode switch 180 switches between the burst detection mode and the gated receive mode in response to the timing circuit 130. During the gated receive mode, slow variations in timing will be corrected by the receiver 160 via a fine timing reference. The receiver 160 generates the fine timing reference from its synchronization resulting from extracting information from the received signal to compensate for slow variations in timing.

The timing circuit 130 provides the sample time to clock the sampling by the analog to digital converter 120 and also provides the sample time for digital circuits of the burst detector 140. The timing circuit 130 could contain, for example, a latch and a counter. Upon detection of the burst as indicated by the coarse timing reference $T_1$, the latch will be triggered causing a mode change by the switch 180. The counter will reset and begin counting in response to the coarse timing reference $T_1$ to generate the sample time for clocking of the analog to digital converter 120 and the burst detector 140.

Figure 2:
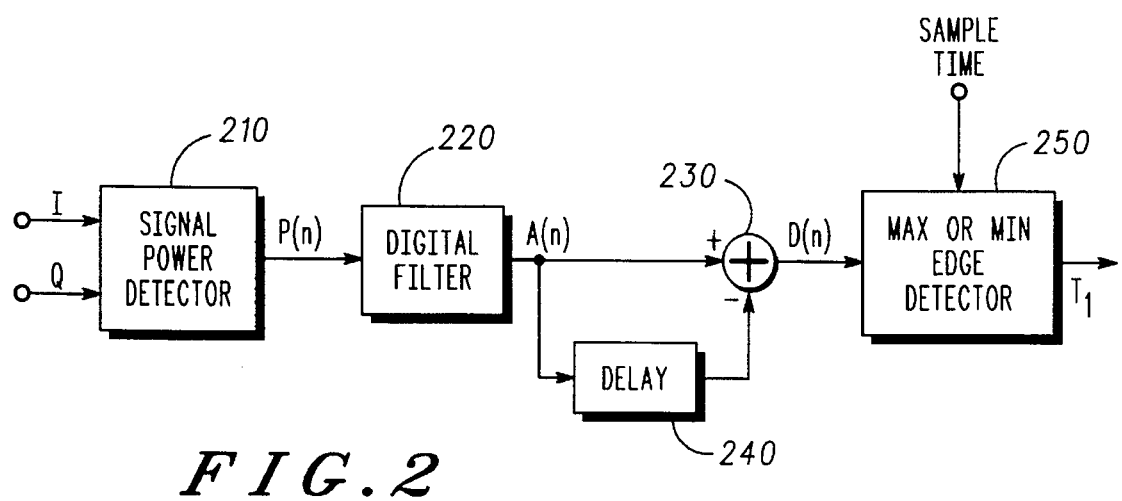
FIG. 2 illustrates a block diagram of an embodiment of a burst detector according to the present invention.

FIG. 2 illustrates a block diagram of an embodiment of a burst detector according to the present invention. A signal power detector 210 detects a power magnitude P(n) of a combination of the digital in-phase signal and the digital quadrature signal. A digital filter 220 having a impulse response corresponding to a magnitude and duration of the expected burst filters the power magnitude P(n) and produces a signal A(n). A subtractor 230 subtracts a delayed version of the signal A(n), produced by a delay circuit 240, from the signal A(n) to provide the detection signal D(n). An edge detector 250 detects an edge of the detection signal D(n).

The digital filter 220 filters the power magnitude P(n) to reduce the power of the noise. The result of this filtering increases the signal to noise ratio and hence improves the quality of the detector. The digital filter 220 could be a finite impulse response (FIR) filter having characteristics close to or approaching that of the expected burst. A digital filter 220 matched to the expected burst would provide the maximum signal to noise ratio. The digital filter 220, however, could be any filter that increases the signal to noise ratio.

The edge detector 250 detects an edge of the detection signal D(n) and is clocked by the sample time of the timing circuit 130. The edge detector 250 could use thresholds to detect the edge of the detection signal D(n). Alternatively, the exemplary edge detector 250 in this embodiment uses a maximum or minimum first, second, third or fourth approach to determine a leading edge of the burst, as will be described below with reference to FIG. 4. The edge detector 250 can also use a fifth approach such as a pattern match approach.

Figure 3:
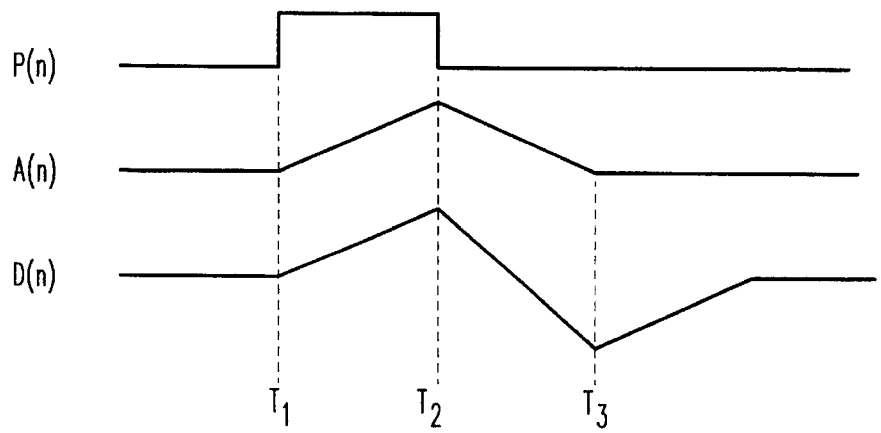
FIG. 3 illustrates a timing diagram plotting signals $P(n)$, $A(n)$, and $D(n)$ according to the present invention.

FIG. 3 illustrates a timing diagram for the burst detector illustrating signals A(n) and D(n) generated in response to an ideal square wave P(n). The maximum and/or minimum of the detection signal D(n) of FIG. 3 can be detected by the edge detector 250 in the below-discussed first, second or third approaches to determine the leading edge of the burst.

The time of the signal A(n) can instead be detected in a fourth approach to determine the leading edge of the signal as will be discussed below with respect to FIG. 4. Additionally, pattern matching of a shape of the detection signal D(n) with an expected waveform such as, for example, the shape for signal D(n) is illustrated in FIG. 3.

Figure 4:
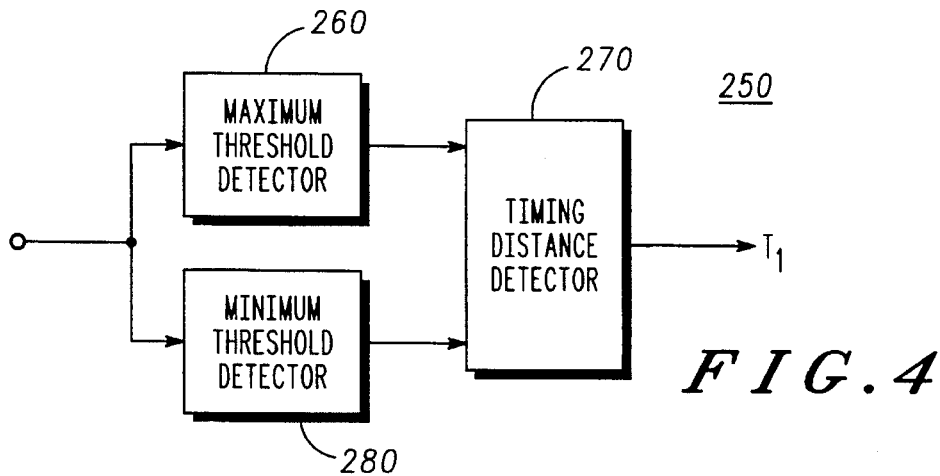
FIG. 4 illustrates a block diagram of implementations of an edge detector.

FIG. 4 illustrates implementations of an edge detector using maximum and/or minimum threshold detectors 260, 280 and a timing distance detector 270. The edge detector 250 detects one of or both the maximum and minimum of the detection signal D(n) when using the below-described first, second and third approaches. Although the maximum threshold detector 260 and the minimum threshold detector 280 are preferably threshold detectors, any selector which identifies the maximum and minimum is appropriate. In the first, second and third approaches, the time of the maximum and/or the time of the minimum can be determined by thresholding. The maximum threshold detector 260 thresholds the detection signal D(n) to determine if the maximum of the detection D(n) is greater than a maximum threshold. The minimum threshold detector 280 thresholds to determine if the detection signal D(n) is less than a minimum threshold.

A first approach in determining the leading edge of the burst is to determine the time of the maximum and the time of the minimum of the detection signal D(n). If the difference in the time of the maximum and the time of the minimum is approximately equal to the duration of the expected bursts, the leading edge of the burst can be determined from the time of the maximum, the time of the minimum and the duration of the expected bursts. The maximum is determined by the maximum threshold detector 260 and the time of the minimum is determined by the minimum threshold detector 280. The distance between the time of the maximum and the time of the minimum is determined by the timing distance detector 270. The timing distance detector 270 is provided by a determining circuit connected to the maximum threshold detector 260 and the minimum threshold detector 280 to determine a leading edge of the burst based on an average of the time of the maximum and of the minimum. The average of the time of the maximum and of the minimum preferably is compared to one and one-half times the expected length of the bursts. Therefore, the leading edge of the bursts is based on an average of the time of the maximum and of the minimum less one and one-half times the expected length of the burst.

A second approach would be to determine the time of the maximum of the detection signal D(n). From the time of the maximum detected by the maximum threshold detector 260 by itself and the duration of the expected burst, the leading edge of the burst can be determined. The illustrated minimum threshold detector 280 and the timing distance detector 270 are not needed in this second approach.

A third approach would be to determine the time of the minimum of the detection signal D(n). From the time of the minimum determined by the minimum threshold detector 280 and the duration of the expected burst, the leading edge of the burst can be determined. The illustrated maximum threshold detector 260 and the timing distance detector 270 are not needed in this third approach.

Alternatively in a fourth approach, the leading edge of the burst could be determined from detecting the time of the maximum of the signal A(n). From the time of the maximum and the duration of the burst the leading edge of the burst can be determined. In this fourth approach, the time of the maximum can be determined by thresholding to determine if the maximum of the detection signal D(n) is greater than a maximum threshold. The maximum threshold detector 260 is thus connected to receive signal A(n).

Figure 5:
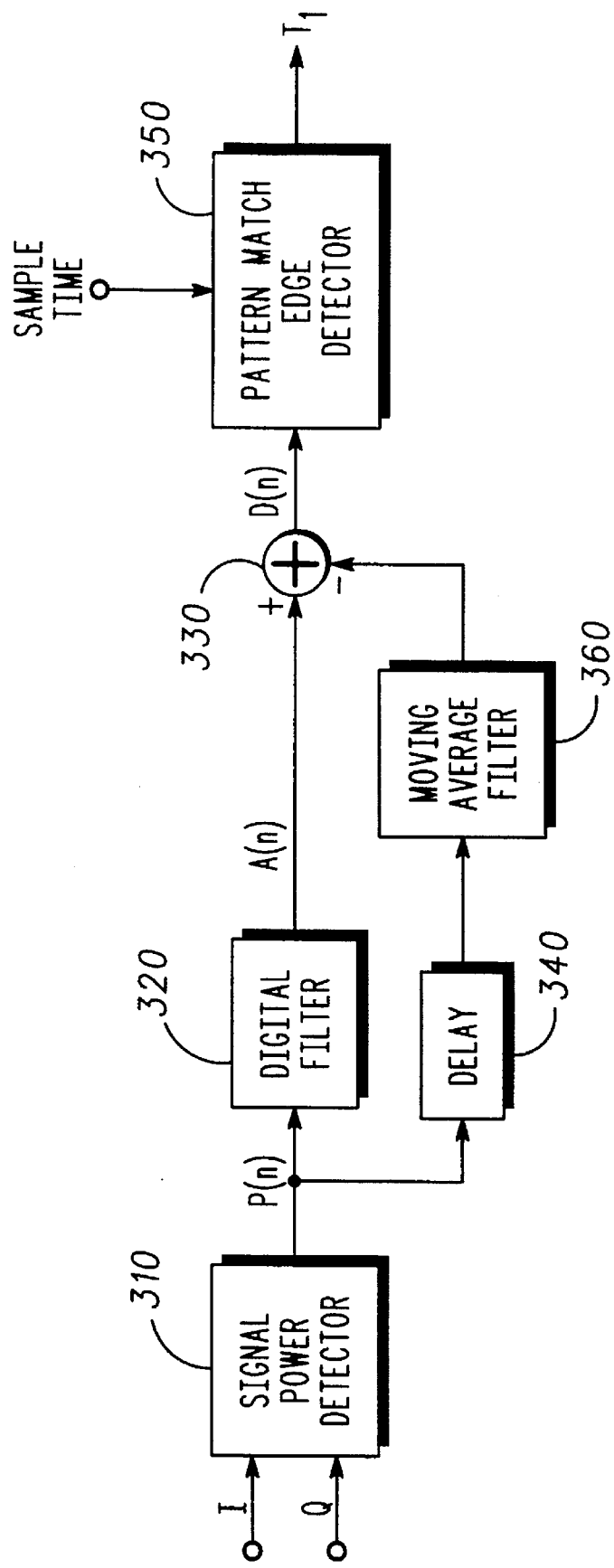
FIG. 5 illustrates a block diagram of an alternative embodiment of a burst detector according to the present invention.

FIG. 5 illustrates a burst detector according to an alternative embodiment of the present invention having a different configuration capable of achieving the same result of the embodiment of FIG. 2. The embodiment of FIG. 4 is mathematically equivalent to the embodiment of FIG. 2. In the embodiment of FIG. 4 a signal power detector 310 detects a power magnitude P(n) of a combination of the digital in-phase signal and the digital quadrature signal. A digital filter 320 having a impulse response corresponding to a magnitude and duration of the expected burst filters the power magnitude P(n) and produces a signal A(n). A delay circuit 340 delays the power magnitude P(n) and a moving average filter 360 filters the delayed power magnitude P(n). The moving average filter 360 also has a impulse response corresponding to a magnitude and duration of the expected burst. A subtractor 330 subtracts an output of the moving average filter 360 from the signal A(n) to provide the detection signal D(n). An edge detector 350 detects an edge of the detection signal D(n).

The edge detector 350 of FIG. 5 is illustrated by the exemplary pattern match edge detector using a fifth approach. The pattern match edge detector in block 350 of FIG. 5 contains a pattern match circuit to pattern match a shape of the detection signal D(n) with an expected waveform such as the shape of, for example, the waveform illustrated for signal D(n) in the timing diagram of FIG. 3. However, the edge detector 350 can also be a maximum and/or minimum edge detector as discussed above with respect to the first, second, third and fourth approaches. Further, any arrangement for the filters and delays could use these and other edge detector approaches.

Figure 6:
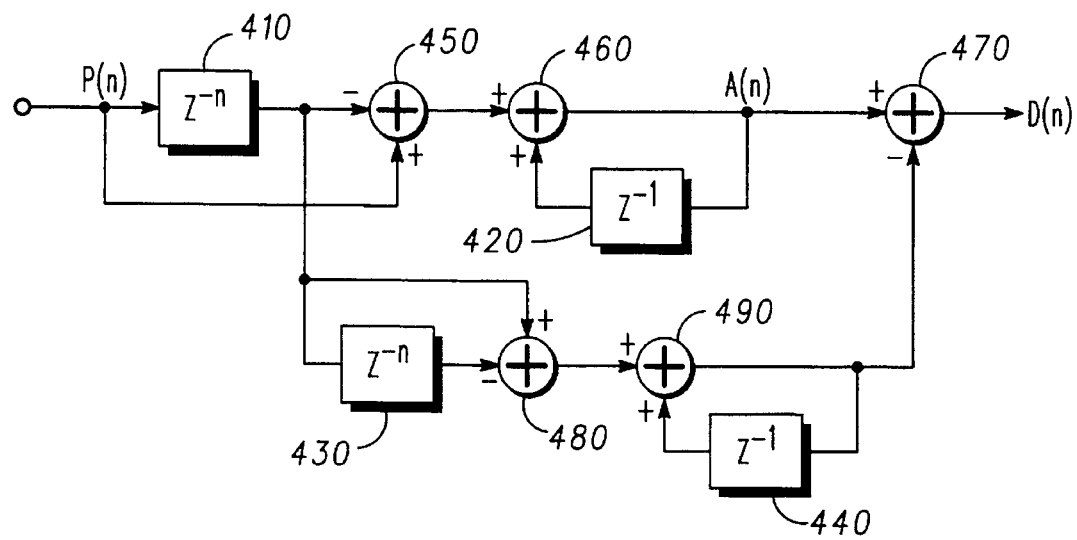
FIGS. 6 and 7 illustrate detailed block diagrams showing alternative implementations of filters and the delays according to the present invention.

FIG. 6 illustrates a detailed block diagram showing an alternative implementation of the filters and the delays according to the present invention. The moving average filters and delays of FIGS. 2 and 5, for example, can be implemented by the illustrated configurations for the delays 410, 420, 430 and 440 and by the illustrated connections therebetween of the adders and subtractors 450, 460, 470, 480 and 490.

Figure 7:
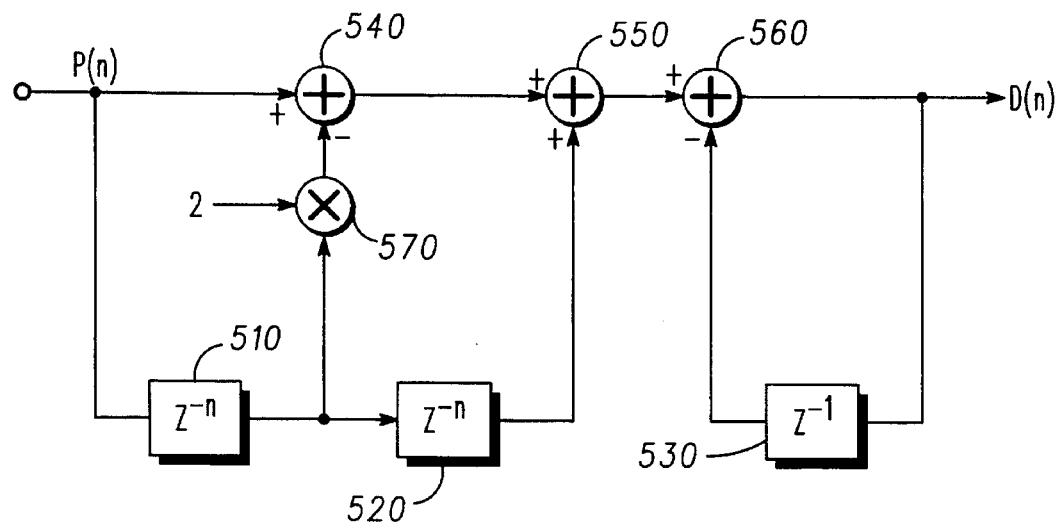

FIG. 7 illustrates a detailed block diagram showing another alternative implementation of the filters and the delays of FIGS. 2 and 5, for example, according to the present invention. Adders and subtractors 545, 550 and 560 are connected between delays 510, 520 and 530 as illustrated. A multiplier 570 multiplies the output of the delay 510 by a factor of two before providing an output to element 540.

Although the invention has been described and illustrated in the above description and drawings, it is understood that this description is by example only, and that numerous changes and modifications can be made by those skilled in the art without departing from the true spirit and scope of the invention. Thus the outputs of the timing circuit 130 may be required by different circuits and not needed by all others. Although the present invention exhibits Doppler shift tolerance, the present invention provides additional advantages as mentioned herein and is thus applicable to all radio communications systems regardless of the need for Doppler shift tolerance such as paging, cellular and satellite communication system receivers.

What is claimed is:

1. A burst detector for detecting a burst, comprising:

a filter having an impulse response characteristic of an expected burst to filter a received signal;

a subtractor operatively coupled to said filter to provide a detection signal by subtracting a filtered version of the received signal from a delayed and filtered version of the received signal; and a burst edge detector operatively coupled to said subtractor to receive the detection signal and to detect a leading edge of the burst.

2. A burst detector according to claim 1, wherein said filter comprises a digital filter having an impulse response corresponding to a magnitude and duration of an expected burst.

3. A burst detector according to claim 1, wherein said filter comprises a moving average filter operatively coupled to provide an average signal based on the received signal.

4. A burst detector according to claim 3, wherein said subtractor comprises a delay stage operatively coupled to said moving average filter to delay the average signal and provide a delayed average signal; and a subtraction circuit operatively coupled to subtract the delayed average signal from said delay stage from the average signal from said moving average filter to provide the detection signal.

5. A burst detector according to claim 4, wherein said moving average filter comprises a finite impulse response filter having a length in relation to a burst length of an expected received signal.

6. A burst detector according to claim 4, wherein said moving average filter comprises at least one finite impulse response filter having taps representative of the impulse response corresponding to a magnitude and duration of the expected burst.

7. A burst detector according to claim 4, wherein said delay stage has a delay corresponding to a duration of the expected burst.

8. A burst detector according to claim 1, wherein said subtractor comprises a delay stage to receive the received signal and provide a delayed received signal;

wherein said filter comprises a first moving average filter to provide the average signal based on the received signal, and a second moving average filter operatively coupled to said delay stage to provide a delayed average signal based on the delayed received signal; and wherein said subtractor further comprises a subtraction circuit operatively coupled to subtract the delayed average signal from said second moving average filter from the average signal from said first moving average filter to provide the detection signal.

9. A burst detector according to claim 8, wherein each of said first and second moving average filters comprises a finite impulse response filter having a length in relation to a burst length of an expected received signal.

10. A burst detector according to claim 8, wherein each of said first and second moving average filters comprises at least one finite impulse response filter having taps representative of the impulse response corresponding to a magnitude and duration of the expected burst.

11. A burst detector according to claim 8, wherein said delay stage has a delay corresponding to a duration of the expected burst.

12. A burst detector according to claim 1, wherein said burst edge detector comprises:

a maximum selector operatively coupled to said subtractor to select a maximum of the detection signal;

a minimum selector operatively coupled to said subtractor to select a minimum of the detection signal; and a timing distance detector operatively coupled to said maximum selector and said minimum selector to determine a leading edge of the burst in response to a time of the maximum, to a time of the minimum and to an expected length of the burst.

13. A burst detector according to claim 12, wherein said maximum selector comprises a maximum threshold circuit operatively coupled to said subtractor to select a maximum of the detection signal above a maximum threshold; and wherein said minimum selector comprises a minimum threshold circuit operatively coupled to said subtractor to select a minimum of the detection signal above a minimum threshold.

14. A burst detector according to claim 13, wherein said maximum threshold circuit determines the maximum threshold based on communication environment noise; and wherein said minimum threshold circuit determines the minimum threshold based on communication environment noise.

15. A burst detector according to claim 13, wherein said maximum threshold circuit thresholds against a predetermined value for the maximum threshold; and wherein said minimum threshold circuit thresholds against a predetermined value for the minimum threshold.

16. A burst detector according to claim 12, wherein said timing distance detector comprises a determining circuit operatively coupled to said maximum selector and said minimum selector to determine a leading edge of the burst based on an average of the time of the maximum and of the minimum less one and one-half times the expected length of the burst.

17. A burst detector according to claim 1, wherein said burst edge detector comprises a maximum selector operatively coupled to said subtractor to select a maximum of the detection signal.

18. A burst detector according to claim 1, wherein said burst edge detector comprises a minimum selector operatively coupled to said subtractor to select a minimum of the detection signal.

19. A burst detector according to claim 1, wherein said burst edge detector comprises a pattern match circuit operatively coupled to said subtractor to pattern match a shape of the detection signal with an expected waveform.

20. A burst detector according to claim 1, further comprising a power detector operatively coupled to provide the received signal to said filter.

21. A burst detector according to claim 20, wherein said power detector comprises a magnitude detection circuit operatively coupled to provide the received signal based on a square of in-phase and quadrature components of an incoming signal.

22. A burst detector according to claim 1, further comprising a radio frequency stage of a radio receiver operatively connected to said filter to convert a radio frequency to an in-phase signal and a quadrature signal and provide the received signal.

23. A burst detector, comprising:

filtering and subtracting means for subtracting a filtered version of a received signal from a delayed and filtered version of the received signal, wherein the received signal is filtered by a filter having an impulse response characteristic of an expected burst; and edge detecting means for detecting a leading edge of a burst in response to said filtering and subtracting means.

24. A method of detecting a burst, comprising the steps of:

(a) subtracting a filtered version of a received signal from a delayed and filtered version of the received signal, wherein the received signal is filtered by a filter having an impulse response characteristic of an expected burst; and (b) detecting a leading edge of a burst in the result of said step (a).

25. A method of detecting a burst according to claim 24, wherein said step (a) comprises the substep of (a1) moving average filtering to provide average signal based on the received signal.

26. A method of detecting a burst according to claim 25, wherein said step (a) further comprises the substeps of (a2) delaying the average signal from said step (a1) to provide a delayed average signal; and (a3) subtracting the delayed average signal from said step (a2) from the average signal from said step (a1).

27. A method of detecting a burst according to claim 26, wherein said step (a1) comprises the substep of (a1i) filtering in a finite impulse response filter having a length in relation to a burst length of an expected received signal.

28. A method of detecting a burst according to claim 26, wherein said step (a1) comprises the substep of (a1i) filtering in at least one finite impulse response filter having taps representative of the impulse response corresponding to a magnitude and duration of the expected burst.

29. A method of detecting a burst according to claim 26, wherein said step (a2) comprises the substep of (a2i) delaying the average signal for a duration corresponding to the duration of the expected burst.

30. A method of detecting a burst according to claim 24, wherein said step (a) comprises the substeps of (a1) delaying the received signal to provide a delayed received signal;

(a2) moving average filtering the received signal to provide a average signal;

(a3) moving average filtering the delayed received signal to provide a delayed average signal based on the delayed received signal; and (a4) subtracting the delayed average signal from the average signal.

31. A method of detecting a burst according to claim 30, wherein said step (a2) comprises the substep of (a2i) filtering in a finite impulse response filter having a length in relation to a burst length of an expected received signal; and wherein said step (a3) comprises the substep of (a3i) filtering in a finite impulse response filter having a length in relation to a burst length of an expected received signal.

32. A method of detecting a burst according to claim 30, wherein said step (a2) comprises the substep of (a2i) filtering in at least one finite impulse response filter having taps representative of an impulse response corresponding to a magnitude and duration of the expected burst; and wherein said step (a3) comprises the substep of (a3i) filtering in at least one finite impulse response filter having taps representative of the impulse response corresponding to the magnitude and duration of the expected burst.

33. A method of detecting a burst according to claim 30, wherein said step (a1) comprises the substep of (a1i) delaying the received signal for a duration corresponding to the duration of the expected burst.

34. A method of detecting a burst according to claim 24, wherein said step (b) comprises the substeps of:
- (b1) selecting a maximum of the result of said step (a);
- (b2) selecting a minimum of the result of said step (a); and
- (b3) determining a leading edge of the burst in response to a time of the maximum, to a time of the minimum and to an expected length of the burst.

35. A method of detecting a burst according to claim 34, wherein said step (b3) comprises the substep of (b3i) determining a leading edge of the burst based on an average of a time of the maximum and of the minimum less one and one-half times the expected length of the burst.

36. A burst detector for detecting a burst, comprising:
- a power detector to detect a power magnitude of a received signal;
- a moving average filter operatively coupled to filter the power magnitude of the received signal and having an impulse response corresponding to a magnitude and duration of an expected burst;
- a subtractor operatively coupled to said moving average filter to provide a detection signal by subtracting a filtered version of the power magnitude of the received signal from a delayed and filtered version of the power magnitude of the received signal;
- a maximum selector operatively coupled to said subtractor to select a maximum of the detection signal;
- a minimum selector operatively coupled to said subtractor to select a minimum of the detection signal; and
- a timing distance detector operatively coupled to said maximum selector and said minimum selector to determine a leading edge of the burst in response to a time of the maximum, to a time of the minimum and to an expected length of the burst.

* * * * *